UNITED STATES PATENT OFFICE.

FREDERIC EUGENE IVES, OF PHILADELPHIA, PENNSYLVANIA.

METHOD OF PRODUCING COLOR PHOTOGRAPHS OR FILMS.

1,248,864.  Specification of Letters Patent.  Patented Dec. 4, 1917.

No Drawing.  Application filed February 4, 1916. Serial No. 76,148.

*To all whom it may concern:*

Be it known that I, FREDERIC EUGENE IVES, a citizen of the United States, residing at Philadelphia, in the county of Philadelphia and State of Pennsylvania, have invented certain new and useful Improvements in Methods of Producing Color Photographs or Films, of which the following is a specification, reference being had therein to the accompanying drawing.

This invention relates to methods of producing color photographs or films. The invention involves both the arts of color photography and motion pictures and constitutes an improvement in both arts.

In its broad aspect, related to the art of color photography, the object of the invention is to afford a simple and convenient mode of producing a multi-color picture or print. With relation to color motion pictures the object of the invention is to afford a film containing a single series of complete multi-color or composite transparent pictures, thus securing adaptability of the film to any ordinary motion picture machine without any special preparation or attachments thereto. In both aspects of the invention the novel method involved and also the product, that is to say, the picture or film, constitute part of the invention. Other objects hereof will be elucidated in the hereinafter following description.

To the attainment of the above referred to objects the present invention consists in the novel processes, steps, and other features hereinafter described.

First will be described one or more embodiments of the invention and thereafter the novel features will be pointed out in the claims.

Two or more simultaneously exposed views or series of views will be supposed to have been taken from substantially a single viewpoint for the purpose of securing color selection negatives from which afterward the positives or diapositives are to be made. The two-color system will be supposed to be employed, for, although the three-color system might be used, the two-color is eminently more simple and is sufficiently satisfactory for general practical purposes.

In exposing for the view or series of views constituting the subject, there may be a red screen interposed in the path of the light rays or in some other way a selection of the red rays made, and in connection therewith a film sensitized specially for red rays may be employed. Thus red-selection negatives are obtained. Similarly a green screen and green sensitive film may be employed for securing green selection negatives.

Cameras have been devised for simultaneously making such exposures. For the purposes of motion pictures in color according to the present invention I propose to employ a pair of carefully matched motion picture cameras, the same coupled together by means of toothed wheel gears so as to operate in complete unison. I also prefer to employ in front of the pair of cameras a light-separating or image-displacing device, such, for example, as has been disclosed in prior application of mine Serial Number 819,345, filed February 18th, 1914, so that rays passing through one aperture or viewpoint are separated into two beams which are directed respectively to the traveling sensitive films of the two cameras. I also preferably so arrange the apparatus or the sensitive films that one series of negatives will be reversed with respect to the other, that is to say, so that the negative images register one with the other when the films are placed face to face.

Having now the color selection negatives, that is the series of negative images made by red light, and a corresponding series made by green light, one series reversed with respect to the other, the procedure to secure the finished color picture or motion picture film is preferably to be as follows.

Still assuming the two-color system, it will be understood that to make a composite positive the complements of the selected colors must be employed. Thus from the red selection negative I will preferably make a blue-green positive and combine with that a red positive made from the green selection negative.

When I say red I mean any of the suitable reds and not necessarily a pure red; and the complementary positive may be a blue or a green or anything between them, and may be described as blue-to-green.

From the green-selection negatives may now be made, by exposure and development, suitable positives on transparent support such as celluloid. In the case of motion picture films these positives may be made on the usual gelatin bromid transparent films. The resulting positives are, of course, black and white images. These, then, are to be converted by any suitable process, such as the well known conversion processes, to a suitable red color.

Similarly from the red selection negatives we may produce black and white positives and convert them to a blue-to-green color. The two resulting sets of positives are relatively reversed and, if brought together face to face, may be accurately registered and will then constitute a composite or multicolor print of the character required.

For practical purposes it is undesirable to operate a motion picture machine with two unattached superposed films, and I therefore prefer to cement them intimately together in face contact, thus, in effect, giving a single multicolor film.

The present invention proposes to go farther and to dispense with such double thickness of celluloid carrier. The additional thickness of the extra layer and the resulting stiffness are both objectionable. According to my invention one of the celluloid backings is to be removed.

For example, after the cementing together of the monochrome positives face to face as described, the celluloid carrier at one side may be dissolved off. The carrier may be composed of some material other than celluloid as long as it is easily soluble.

The complete process, after securing the monochrome positives, may be as follows. I may first wet the two films, preferably with a dilute gelatin solution, and thereupon intimately press them into face contact while in proper registration. Thereupon, while the monochrome colloid images are still in a wet condition, and inclosed between the celluloid carriers, one of the carriers is to be dissolved off. The inclosed colloid films readily remain wet and soft because of the substantial impermeability of the celluloid carriers.

The dissolving off of one of the carriers will be effected by means of any suitable solvent, such as amyl acetate, which removes the celluloid without injuring the colloid layer or the contained images. After the removal of the celluloid carrier, the superposed wet films may be rapidly dried, leaving them firmly united in face to face contact.

This completes the process and yields a composite or superposed multiple or double film carrying the two-color images in registry upon the face of a single celluloid carrier.

The novel product of this invention is a color photograph or film consisting of a pair of differently colored monochrome images contained in colloid or similar layers and secured permanently to each other face to face, one of them having a suitable carrier or backing and the other, in the preferred product, being without any carrier or backing.

I have thus described a simple embodiment of the present invention securing the advantages referred to, and other advantages will be apparent to those skilled in the art. Many modifications are possible without departing from the principles involved and therefore no limitation to details is intended excepting so far as set forth in the claims.

As an instance of a modification of the above described process, one of the carriers or celluloid strips may be gelatin coated on the back. The gelatin is not soluble in amyl acetate. Therefore, after cementing, the resultant film or picture may be simply run through a bath of amyl acetate without any further precaution to protect one of the celluloid carriers. The colloid coating protects one carrier and the solution dissolves off the other.

As an alternative one of the celluloid carriers may be frictionally brushed with a soft brush wetted with the solvent, the operation being repeated until the wet gelatin films are uncovered so as to be capable of drying out in the usual way.

What is claimed is:

1. The process of making color motion picture films from red and green selection negatives reversed with respect to one another, said process comprising the steps of photographically preparing from the respective negatives monochrome positives respectively of blue-to-green and red colors and carried on suitable transparent carriers, and then assembling and permanently securing said positives face to face in register, with the carriers at the outside.

2. The process of making color motion picture films from suitable color selection negatives reversed with respect to one another, said process comprising the steps of photographically preparing from the respective negatives monochrome positives of suitable complementary colors and carried on suitable transparent carriers, and then assembling said positives face to face in register, attaching them permanently and then removing one of said carriers.

3. The process of making color motion picture films from red and green selection negatives reversed with respect to one another, said process comprising the steps of photographically preparing from the respective negatives monochrome positives respectively of blue-to-green and red colors and carried on suitable transparent carriers, and then assembling said positives face to face in register, attaching them permanently and then removing one of said carriers.

4. The process of making color motion picture films from red and green selection negatives reversed with respect to one another, said process comprising the steps of photographically preparing from the respective negatives monochrome positives consisting respectively of blue to green and red layers upon transparent carriers, and then attaching said positives face to face in register, by cementing together the image layers thereof.

5. The process of making color motion picture films from suitable color selection negatives reversed with respect to one another, said process comprising the steps of photographically preparing from the respective negatives monochrome positives each consisting of a color image layer upon a transparent carrier, and then attaching said positives face to face in register, by cementing together the image layers thereof and then removing one of the carriers, leaving both image layers attached to the other carrier.

6. The process of making color motion picture films from suitable color selection negatives reversed with respect to one another, said process comprising the steps of photographically preparing from the respective negatives monochrome positives each consisting of a colored image layer upon a transparent carrier, and then attaching said positives face to face in register, by cementing together the image layers thereof and then removing one of the carriers, by dissolving in a suitable agent, leaving both image layers attached to the other carrier.

7. The process of making color motion picture films from suitable color selection negatives reversed with respect to one another, said process comprising the steps of photographically preparing from the respective negatives monochrome positives each consisting of a colored image layer upon a celluloid carrier, and then attaching said positives face to face in register, by cementing together the image layers thereof, and then dissolving off one carrier by a suitable agent.

8. The process of making color motion picture films from suitable color selection negatives reversed with respect to one another, said process comprising the steps of photographically preparing from the respective negatives monochrome positives each consisting of a colored image layer upon a celluloid carrier, and then attaching said positives face to face in register, by cementing together the image layers thereof, and then dissolving off one carrier by a suitable agent, while protecting the other carrier with a coating of gelatin or the like.

9. The process of making color photographs from suitable color selection negatives reversed with respect to one another, said process comprising the steps of photographically preparing from the respective negatives monochrome positives of suitable complementary colors and carried on suitable transparent carriers, and then assembling and permanently securing said positives face to face in register, with the carriers at the outside.

10. The process of making color photographs from red and green selection negatives, one relatively reversed with respect to the other, comprising the steps of photographically preparing from the respective negatives monochrome positives respectively of blue-to-green and red colors and carried on suitable transparent carriers, and then assembling said positives face to face in register, attaching them permanently and then removing one of said carriers.

11. The process of making color photographs from suitable color selection negatives reversed with respect to one another, said process comprising the steps of photographically preparing from the respective negatives monochrome positives each consisting of a colored image layer upon a celluloid carrier, and then attaching said positives face to face in register, by cementing together the image layers thereof, and then dissolving off one carrier by a suitable agent, while protecting the other carrier with a coating of gelatin or the like.

In testimony whereof, I have affixed my signature hereto.

FREDERIC EUGENE IVES.